Jan. 21, 1964     T. R. PULLEY     3,118,982
CAM OPERATED TIMING DEVICE
Filed Dec. 1, 1960     5 Sheets-Sheet 1
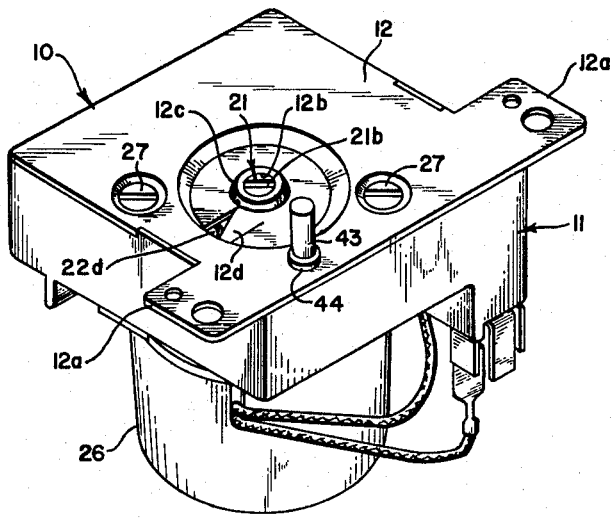
Fig. 1
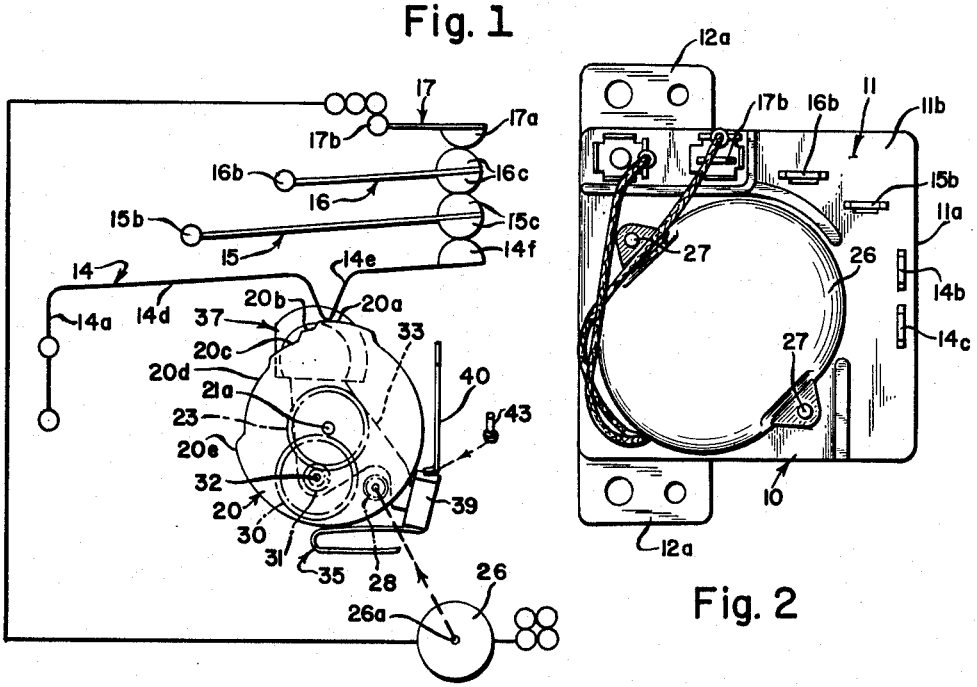
Fig. 2
Fig. 3
INVENTOR
THOMAS R. PULLEY
BY *Roy E. Raney*
ATTORNEY

INVENTOR
THOMAS R. PULLEY

BY Roy E. Raney

ATTORNEY

Jan. 21, 1964 T. R. PULLEY 3,118,982
CAM OPERATED TIMING DEVICE
Filed Dec. 1, 1960 5 Sheets-Sheet 3
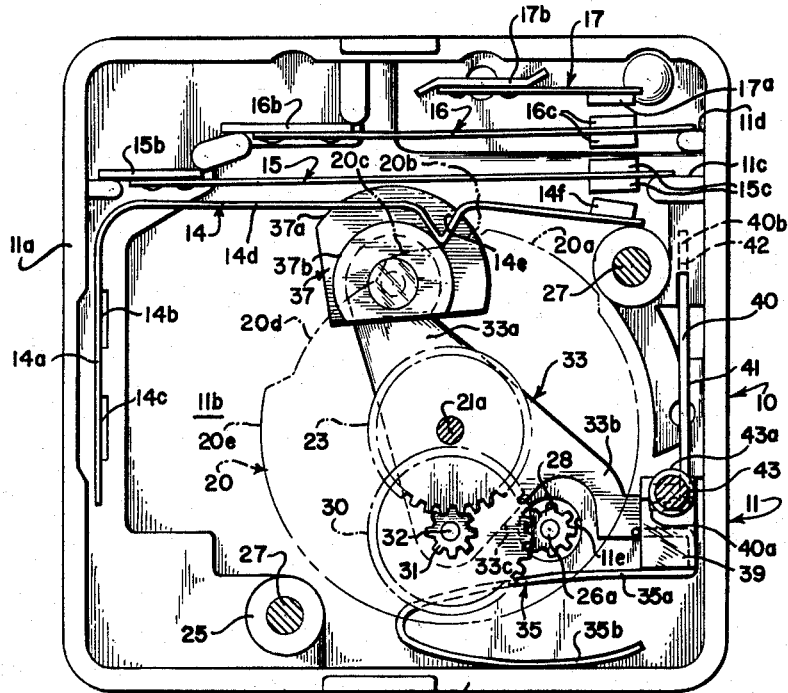
Fig. 6
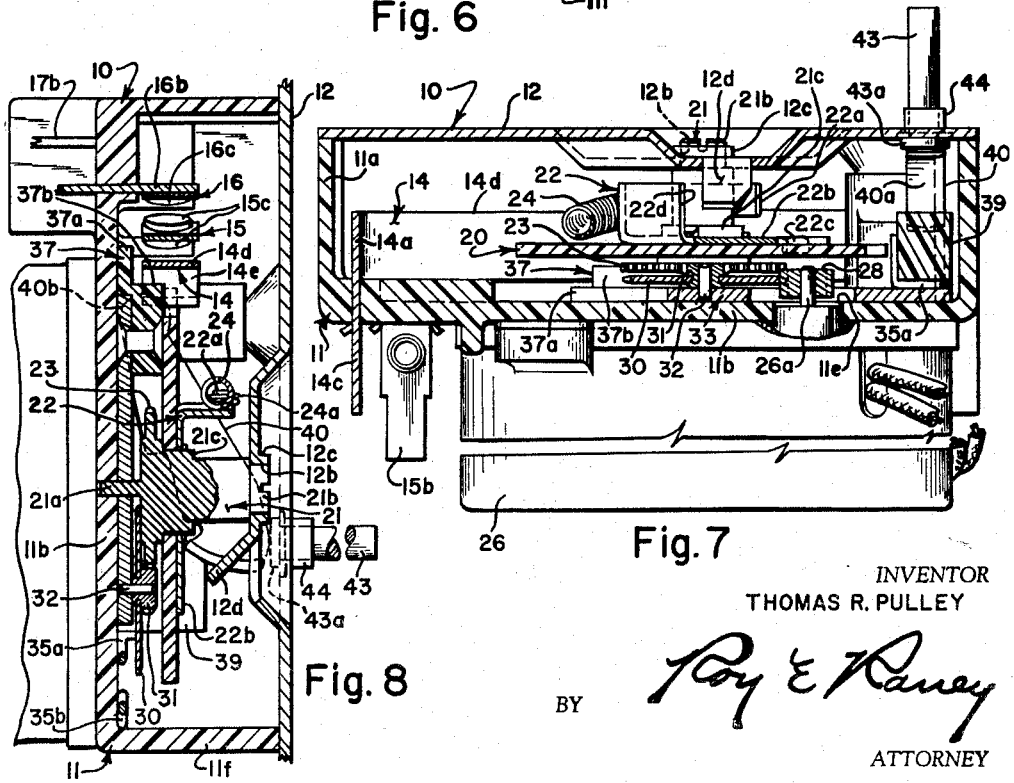
Fig. 7
Fig. 8
INVENTOR
THOMAS R. PULLEY
BY Roy E. Raney
ATTORNEY Jan. 21, 1964   T. R. PULLEY   3,118,982
CAM OPERATED TIMING DEVICE
Filed Dec. 1, 1960   5 Sheets-Sheet 4

INVENTOR
THOMAS R. PULLEY
BY Roy E. Raney
ATTORNEY

Jan. 21, 1964  T. R. PULLEY  3,118,982
CAM OPERATED TIMING DEVICE
Filed Dec. 1, 1960  5 Sheets-Sheet 5
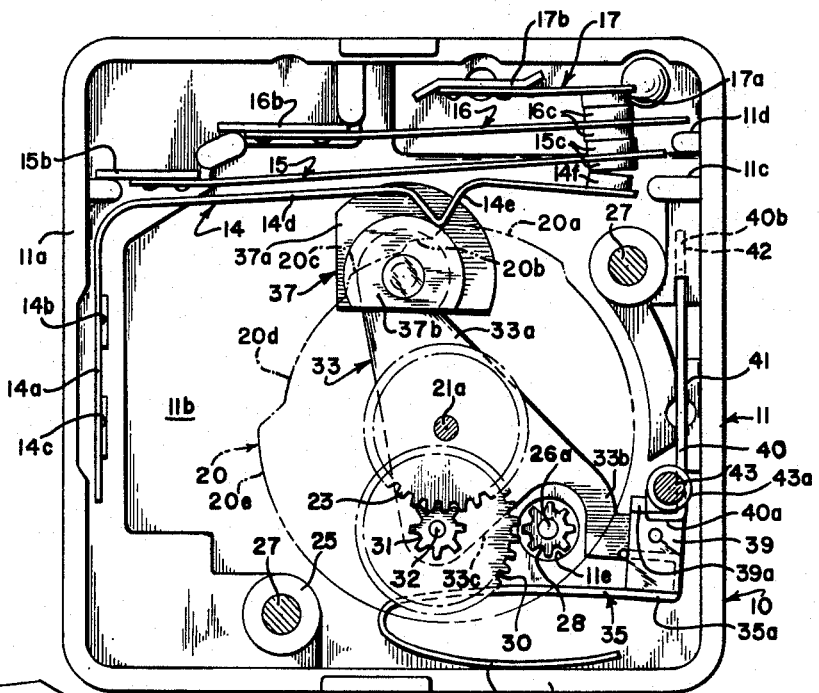
Fig. 11
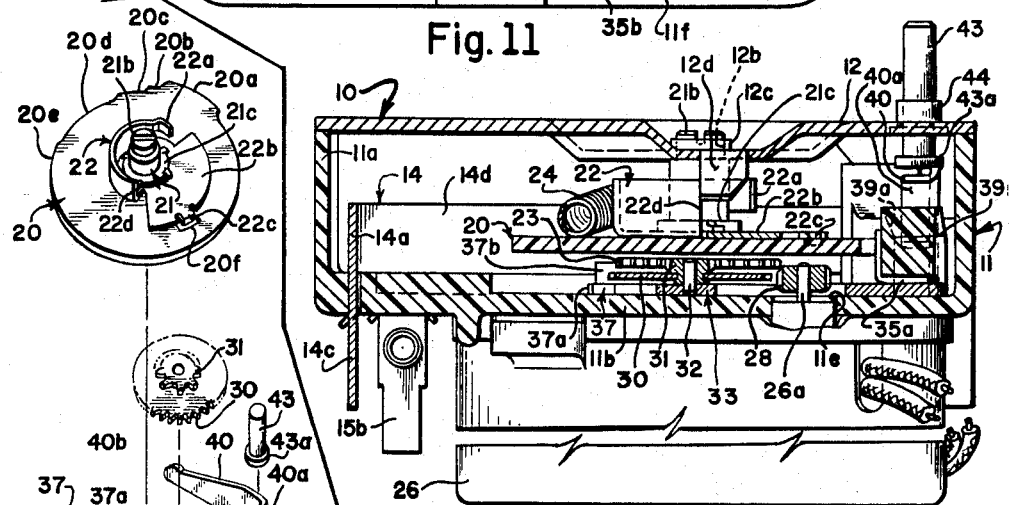
Fig. 12
Fig. 13
INVENTOR
THOMAS R. PULLEY
BY  *Roy E. Ramey*
ATTORNEY United States Patent Office 3,118,982
Patented Jan. 21, 1964

3,118,982
CAM OPERATED TIMING DEVICE
Thomas R. Pulley, Columbus, Ohio, assignor to Ranco Incorporated, Columbus, Ohio, a corporation of Ohio
Filed Dec. 1, 1960, Ser. No. 73,085
7 Claims. (Cl. 200—38)

This invention relates to motor driven timers or timing switches, and more particularly to an improved timer of the type used for controlling the energization of various circuits utilized in certain equipment, such as clothes driers and the like.

Timers of the above mentioned character for controlling the program or cycle of operation of clothes driers, washing machines, and the like, have been proposed wherein a rotatable knob or dial has been provided for returning the timer to a condition for starting a subsequent cycle or for interrupting the cycle before the completion thereof. Such timers or control devices often require the use of various cams, cam followers, cam drives, switch means and the like, which require that the device be advanced through any uncompleted operations to return to its starting condition. It is an object of the present invention to provide an improved timer or control device for the program of operations of a drier or the like, comprising a switch operating cam which can be returned or re-set to its start position by simply depressing a push button and wherein means are provided for eliminating the necessity of going through any uncompleted operations of the drier when interrupting the cycle and returning the cam to its starting position.

A more specific object of this invention is the provision of a timer including a timing motor for driving a cam in one direction through drive means which is adapted to be selectively operated to disconnect the cam from the motor to permit the cam to be rotated by suitable means, such as a spring, in the opposite direction, the timer including switch means, comprising a cam follower, and means for disengaging the cam follower from the surface of the cam during the time the latter is disconnected from the motor, so that the cam may be easily returned to its starting position without interference by the cam follower and without actuation of the switch means by the cam.

Other objects and advantages of the present invention will become apparent from the following detailed description of a preferred embodiment thereof, and from the accompanying sheets of drawings forming a part of this specification, and in which:

FIG. 1 is a perspective view of a timer embodying this invention;

FIG. 2 is a bottom view of the timer of FIG. 1;

FIG. 3 is a diagrammatic illustration of the arrangement of various switch elements of the device;

FIG. 6 is a view similar to FIG. 4, but with some parts removed;

FIG. 7 is a sectional view taken substantially along line 7—7 of FIG. 4;

FIG. 8 is a sectional view taken substantially along line 8—8 of FIG. 4;

FIG. 11 is a plan view similar to FIG. 9 but with some parts removed;

FIG. 12 is a sectional view taken substantially along line 12—12 of FIG. 9; and

FIG. 13 is an exploded view of the cam and various associated parts.

Figure 4:
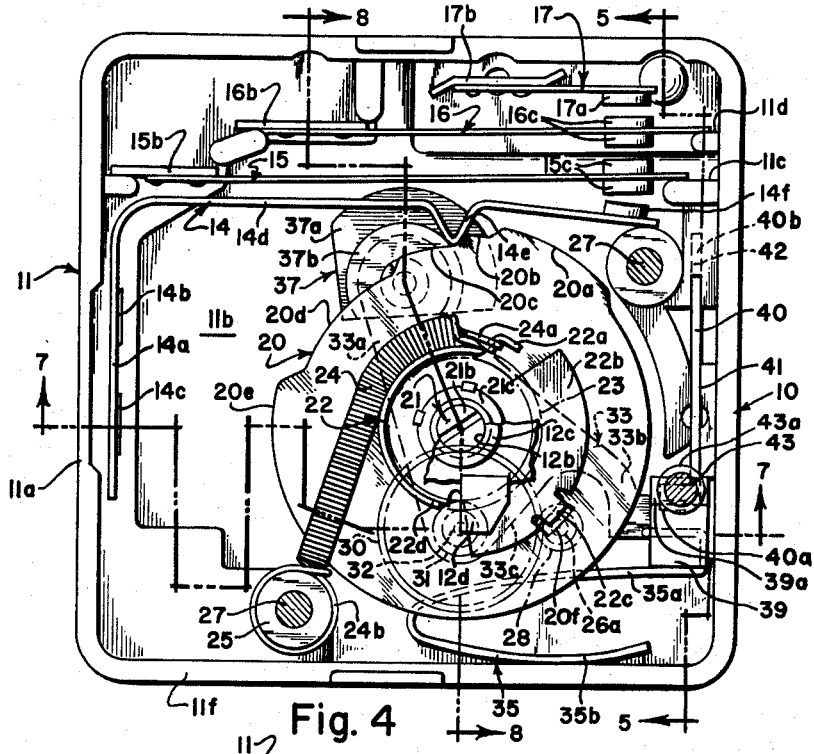
FIG. 4 is a plan view of the timer with the cover plate removed.
Figure 5:
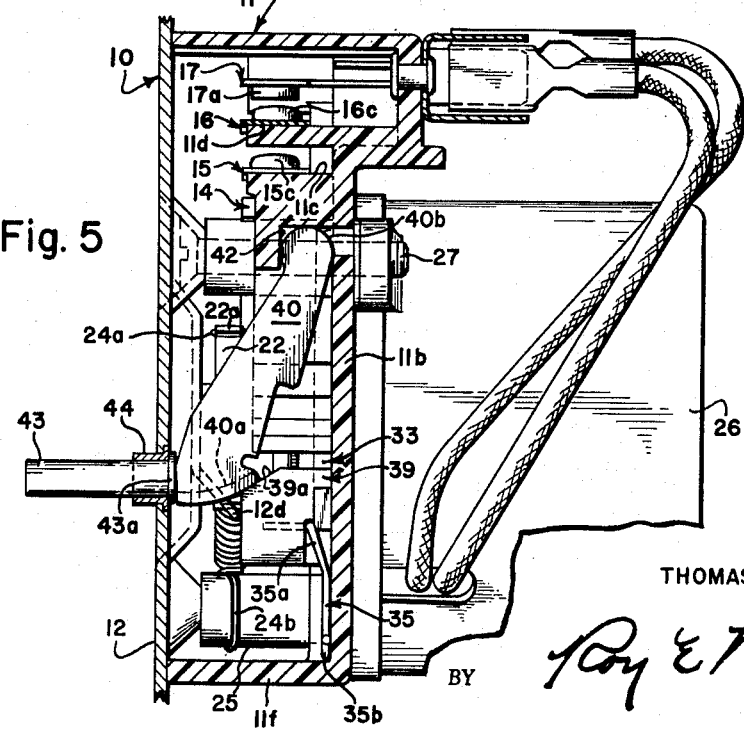
FIG. 5 is a sectional view of the timer taken substantially along line 5—5 of FIG. 4.

A timer 10, embodying the present invention, is illustrated in the drawings and is described hereinafter with reference to the controlling of a cycle or program of operations in a clothes drier, not shown, of the type having a revolving drum or tumbler, air heating means, a fan to blow the heated air through the drum, and a motor for driving the fan in drum. Timer 10 comprises a generally rectangular housing 11, preferably formed of a suitable insulating material, and normally closed by a cover plate 12 having suitable mounting lugs 12a for securing the timer to a control panel of the drier. Housing 11 contains cam operated switch means for effecting timed energization of the heater and of the drum motor during an operating cycle of the drier. The specific circuits involved in the energization of the heater and drum motor are not necessary to a disclosure of this invention and they will not be described in detail here. Suffice it to say that those circuits may include other control elements such as push button means for selecting the temperature at which the heater is to operate, centrifugal switch means for the drum motor, and the like.

In the form of the invention shown, the switch means comprises a switch member 14 including a leg 14a which extends along a side wall 11a of housing 11, and which has a pair of terminal lugs 14b and 14c disposed in openings in the back wall 11b of the housing with a press fit, thereby securing switch member 14 thereto. Switch member 14 has a movable leg 14d extending substantially at right angles from leg 14a, which movable leg has a V-shaped cam follower portion 14e and is provided with a contact 14f at the free end thereof.

A plurality of flexible switch leaves 15, 16 and 17 extend parallel to leg 14d for cooperation therewith in a manner later described. Leaf 15 is secured at one end thereof to housing wall 11b by a terminal lug 15b pressed through an opening therein, and is provided at the free end thereof with a double contact 15c in alignment with contact 14f. The free end of leaf 15 is normally biased by the spring action thereof into engagement with a stop 11c formed in the housing. Leaf 16 is likewise secured at one end thereof to housing wall 11b by a terminal lug 16b pressed through an opening therein, and is provided at its free end with a double contact 16c in alignment with contact 15c. The free end of leaf 16 is normally biased by the spring action thereof into engagement with a stop 11d formed in the housing. Leaf 17 is provided with a relatively stationary contact 17a, in alignment with contact 16c, and is secured to housing 11 by a terminal lug 17b pressed through an opening in wall 11b. The terminal lugs, such as 14b, 15b, 16b and 17b protruding from the rear wall 11b of housing 11, provide for the convenient connection of the timing device into the various circuits of the clothes drier. Leg 14 is adapted to be moved to bring contact 14f thereof into moving engagement with contact 15c, which is in turn adapted to engage and move contact 16c into engagement with contact 17a, in which condition all of the mentioned contacts are held together as shown in FIG. 3.

A generally circular switch operating cam 20, having stepped cam surfaces 20a, 20b, 20c, 20d and 20e, is rotatably mounted adjacent movable leg 14d, and cam follower portion 14e of which is adapted to ride on the stepped cam surfaces for operating the switch means. Cam 20 is preferably formed of a suitable insulating material and is mounted for rotation with a shaft 21 having a pivot pin portion 21a and a reduced end portion 21b in which a tool receiving slot is formed. A semi-circular drum member 22, having a hook 22a at one end thereof, is mounted on shaft 21 for rotation with cam 20, and has a segment 22b overlying the surface of cam 20, the segment having a lug 22c engaged in an opening 20f of the cam for assuring rotation of the cam and drum in unison. Shaft 21 has a gear 23 formed integrally therewith and a flange 21c which is staked as shown for securing drum member 22 and cam 20 together between the flange and gear.

The pivot pin portion 21a of shaft 21 is journaled in an opening in rear wall 11b of the housing, while the reduced end 21b is received in an opening 12b in cover plate 12, and the material of plate 12 surrounding that opening is extruded to form a wall 12c providing bearing support for the shaft. An extension spring 24 has an eye 24a at one end thereof engaging hook 22a of drum 22, and an eye 24b at the other end thereof engaging a spacer post 25 formed in housing 11. It will be recognized that rotation of cam 20 in a clockwise direction will wind spring 24 about the periphery of drum member 22 and that the spring will tend to cause counter-clockwise rotation of the cam.

Cam 20 is driven in a clockwise direction for operation of the switch means by an electric timer motor 26 which is conveniently secured to the rear wall 11b of housing 11 by screws 27 extending through cover plate 12 and housing 11. Motor 26 is of a conventional type of self-starting synchronous motor having reduction gearing, not shown, and an output shaft 26a extending through an opening 11e in housing wall 11b and provided with a pinion 28 thereon.

Drive means are provided in the form of a gear train between motor 26 and cam 20, and normally serving to connect the motor in driving relation with the cam for rotation thereof in a clockwise direction, and selectively operable to disconnect the motor from driving relation with the cam to permit rotation of the latter in a counter-clockwise direction under the influence of spring 24. The gear train includes a gear 30 in meshing engagement with pinion 28 and having a pinion 31 secured thereto for rotation therewith. Gear 30 and pinion 31 are rotatably mounted on a staff 32 carried by a flat lever member 33 disposed against rear housing wall 11b with pinion 31 in meshing engagement with gear 23 on shaft 21.

Lever member 33 is in the form of a bell crank pivoted about pivot pin portion 21a of shaft 21 and includes a leg 33a and a leg 33b, the latter having an arcuate cut-out 33c around pinion 28 as is best illustrated in FIG. 6. A hairpin shaped spring 35 has one leg 35a thereof secured to leg 33b of lever 33, and has a leg 35b thereof bearing against a side wall 11f of the housing. Spring 35 tends to rotate lever 33 in a counter-clockwise direction about pivot pin 21a thereby normally maintaining gear 30 in mesh with pinion 28.

Figure 9:
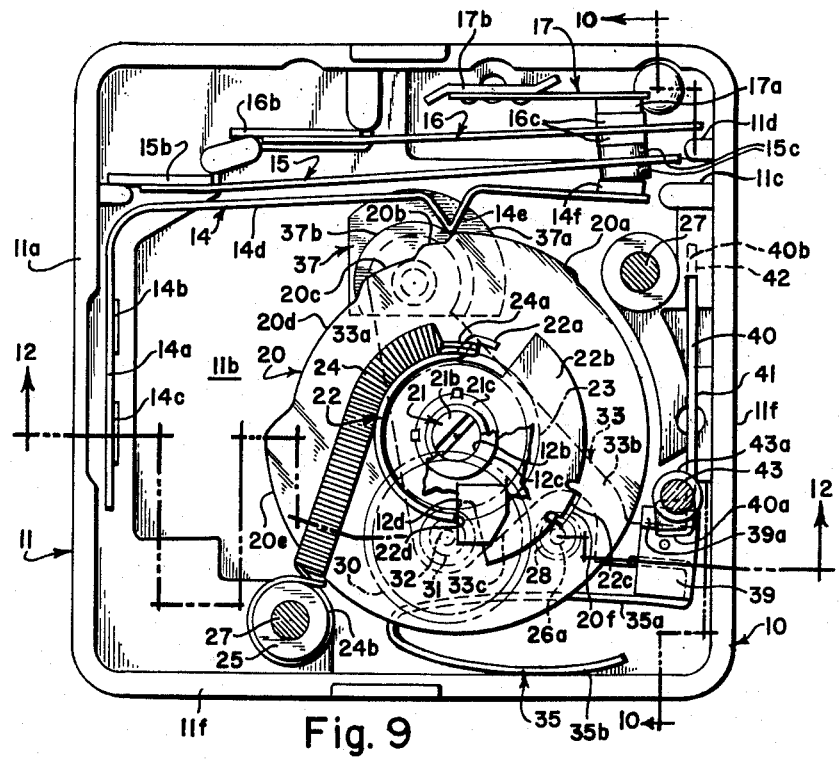
FIG. 9 is a plan view similar to FIG. 4 but showing the parts in another position.

It will be seen that upon rotation of pinion 28 in a clockwise direction, cam 20 will be rotated in a clockwise direction at a reduced rate, which in this instance is in the order of one revolution per hour. It will also be seen that rotation of lever member 33 in a clockwise direction about pivot pin 21a will move gear 30 out of meshing engagement with pinion 28 as illustrated in FIG. 11, thereby freeing cam 20 for rotation in a counter-clockwise direction under the influence of spring 24. Such counter-clockwise rotation of cam 20 by spring 24 is limited by a depending stop lug 12d which is struck out from cover 12 and extends into the path of drum member 22 for engagement by an end 22d thereof. Cam 20 is positioned thereby with cam follower 14e on cam surface 20a with all of the contacts closed as shown in FIG. 9.

In order to prevent interference between the cam follower 14e and the relatively steep slope between each of the stepped cam surfaces 20a, 20b, 20c, and 20d of cam 20 during the time the latter is rotated in a counter-clockwise direction by spring 24, means are provided for moving the cam follower out of engagement with the surface of the cam. To this end, a pusher member 37 of nylon, "Teflon" (tetraethylfluorine) or other friction-free insulating material, is secured to the end of leg 33a and comprises a flange 37a and a boss 37b adjacent cam follower 14e. Upon movement of lever member 33 in a direction to disengage gear 30 from pinion 28, pusher member 37 will engage cam follower 14e and move the latter out of engagement with the surface of cam 20. Thus, means are provided for disengaging the motor from driving relation with the cam and for substantially simultaneously holding the switch means out of engagement therewith so that the cam can be returned to its starting position by spring 24.

Figure 10:
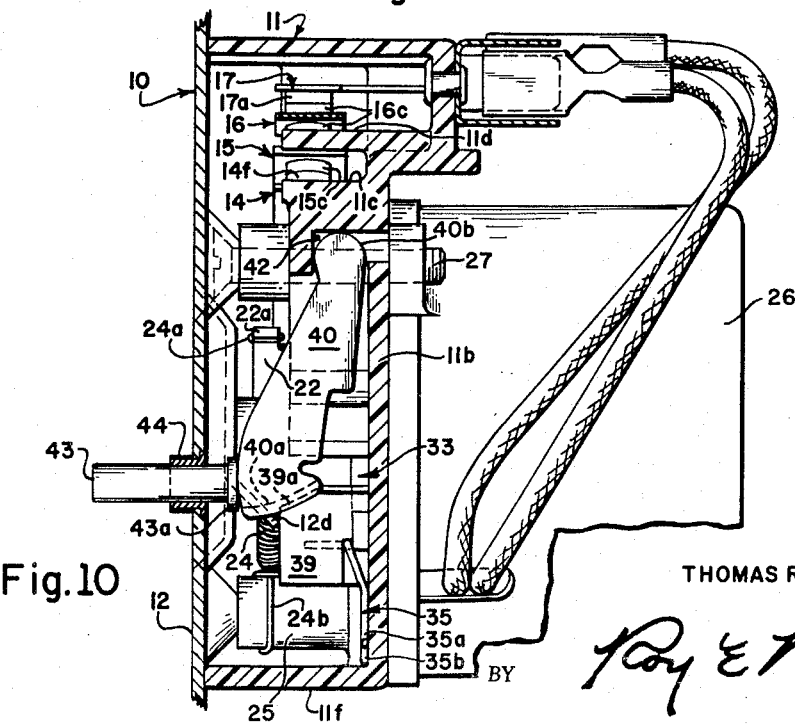
FIG. 10 is a sectional view taken substantially along line 10—10 of FIG. 9.

Manually operable means are provided for causing the lever member 33 to move gear 30 out of engagement with pinion 28 and to effect disengagement of cam follower 14e from cam 20. A block 39 of nylon, "Teflon," or other smooth, friction-reducing material, is secured to the end of leg 33b of lever member 33 and presents a sloping face 39a. A lever 40, having a turned end 40a in engagement with sloping surface 39a, is disposed in a groove 41 formed in housing 11 adjacent side wall 11f thereof, and is provided with a circular end portion 40b in pivotal engagement with a socket portion 42 of housing 11. A push button 43 is reciprocably mounted in a bushing 44 which is pressed into an opening in cover plate 12. Push button 43 has an enlarged end portion 43a in engagement with lever 40, and is adapted to press that lever downward against block 39, moving the latter aside against the action of spring 35 and rotating lever member 33 to disengage gear 30 from pinion 24, as is best shown in FIGS. 9, 10 and 11, and to move cam follower 14e out of engagement with cam 20.

With cam 20 in its starting position as illustrated in FIG. 3, and upon the commencement of a drying cycle, all of the contacts are closed and the circuits for the drum motor, heater, and timer motor are energized, and cam 20 is driven in a clockwise direction by the timer motor. In the present example, contacts 16c and 17a complete a circuit by-passing a centrifugal switch, not shown, in the drum motor circuit, and as cam follower portion 14e drops from cam surface 20a to surface 20b contact 16c will move away from contact 17a, and thereafter the centrifugal switch will maintain the drum motor energized through a circuit including contacts 14f and 15c. After the number of minutes required for surface 20b to be traversed, and as cam follower 14e drops from surface 20b to surface 20c as shown in FIG. 4, contact 15c will move away from contact 16c which is connected through terminal 16b to the heater circuit, thereby terminating the heating phase of the cycle. The opening of contacts 15c, 16c is effected in a rapid manner to prevent arcing by the provision of a steep slope between surfaces 20b and 20c and by the presence of stop member 11d which abruptly halts movement of leaf 16 as cam follower 14e moves from one of those surfaces to the other. As cam 20 continues its rotation, cam follower 14e moves from surface 20c to surface 20d thereby moving contact 14f, which is connected to the drum motor centrifugal switch through terminal 14b, away from contacts 15c to stop the drum motor, the opening being effected rapidly by the abrupt stopping of movement of leaf 15 by stop 11c.

During the clockwise rotation of cam 20 under the influence of timer motor 26, spring 24 has been wound about the periphery of drum member 22 and is thereby extended and tends to rotate cam 20 in a counter-clockwise direction. The timer 10 may now be returned or re-set to its initial starting condition by simply pressing the button 43 to operate the drive means in the manner previously described to release cam 20 from driven relation with motor 26 and to hold cam follower 14e out of engagement therewith during rotation of the cam by spring 24.

It will be observed that the switch member 14 is moved aside by pusher member 37 substantially simultaneously with the disengagement of gear 30 from pinion 28 so that a relatively light weight spring 24 may be used to cause cam 29 to fly back to its starting position without interference by the relatively steep slopes between the cam surfaces thereof against the cam follower portion 14e. It will also be observed that the push button 43 may be depressed at any time during the rotation of cam 29 by timer motor 26 to interrupt the cycle and return the cam to its starting position, for example, when it is desired to insert additional clothes to be dried together with clothes which have been partially dried at the time of the interruption.

From the foregoing description of a timer or control apparatus embodying the present invention, it will be appreciated that there has been provided by this invention a particularly simple yet effective device for controlling the program of operations in apparatus such as clothes driers, and the like, which can be conveniently and rapidly returnd or re-set to a condition for begining the program by simply depressing a push button.

Although the invention has been described with reference to a specific form of timing device and to a particular use thereof, it is understood that the invention is not limited thereby but, rather, the invention includes all those changes, adaptations, and uses as are reasonably embraced by the scope of the claims hereof.

Having described my invention, I claim:

1. In a timing device of the character described, a timer motor, a cam, drive means between said motor and said cam for effecting rotation of the latter and operable to disconnect said motor and cam to permit rotation of the latter free of said motor, a switch member in engagement with said cam for actuation thereby upon rotation by said drive means, and means connected with said drive means for moving said switch member out of engagement with said cam when said drive means is operated to disconnect said motor and cam.

2. In a timing device, a timer motor, a cam, drive means between said motor and cam for effecting rotation of said cam and selectively operable to disconnect said motor and cam, spring means connected to said cam for rotating said cam when disconnected from said motor, a switch member engaging said cam for movement thereby upon rotation of said cam by said drive means, and switch moving means connected with said drive means and operable to move said switch member out of engagement with said cam simultaneously with operation of said drive means to disconnect said cam and motor, whereby movement of said cam by said spring is free of interference by said switch member.

3. A timing device as defined in claim 2 and wherein said drive means comprises a gear train having at least one gear thereof connected with said switch moving means for movement into and out of meshing engagement with another gear.

4. In a timing device of the character described, a timer motor having a drive pinion, a cam, gear means connected with said cam and movable into and out of meshing engagement with said pinion, said motor being adapted to rotate said cam in one direction during said meshing engagement, spring means connected to said cam for rotation thereof in the opposite direction when said gear means is out of said meshing engagement, switch means including a cam follower in engagement with said cam for movement thereby during rotation in said one direction, means connected to said gear means and actuable to effect said movement of said gear means into and out of engagement, the last said means being actuable to engage said cam follower for effecting movement thereof out of engagement with said cam simultaneously with effecting said movement of said gear means out of engagement with said pinion.

5. In a timing device of the character described, a timer motor having a drive pinion, a cam, gear means connected with said cam and movable into and out of meshing engagement with said pinion, said motor being adapted by said gear means to rotate said cam in one direction during said meshing engagement, spring means connected to said cam for rotation thereof in the opposite direction when said gear means is out of said meshing engagement, switch means including a cam follower in engagement with said cam for movement thereby during rotation in said one direction, lever means connected to said gear means and actuable to effect said movement of said gear means into and out of said meshing engagement, said lever means being actuable to engage said cam follower and to effect movement thereof out of engagement with said cam simultaneously with effecting said movement of said gear means out of engagement with said pinion, and manually operable means connected with said lever means for actuation thereof.

6. A timing device as defined in claim 5 wherein said lever means comprises a bell crank having a portion of said gear means mounted thereon and including a cam follower engaging member.

7. A timing device as defined in claim 5 wherein said lever means comprises a bell crank rotatable about a pivot and having first and second leg portions, one of said leg portions being adapted to engage said cam follower for movement thereof out of engagement with said cam, and wherein said manually operable means comprises a push button adapted to act on the other of said leg portions for rotation of said bell crank.

References Cited in the file of this patent

UNITED STATES PATENTS

| | | |
|---|---|---|
| 2,577,155 | Rex | Dec. 4, 1951 |
| 2,837,664 | Lindstrom et al. | June 3, 1958 |
| 2,891,617 | Wharton | June 23, 1959 |